US011433823B2

(12) United States Patent
Neumann et al.

(10) Patent No.: US 11,433,823 B2
(45) Date of Patent: Sep. 6, 2022

(54) HINGE MECHANISM AND ARMREST CONSOLE INCLUDING HINGE MECHANISM

(71) Applicant: Ford Global Technologies, LLC, Dearborn, MI (US)

(72) Inventors: Michael Neumann, Gisborne (AU); Dave Spink, Jan Juc (AU); Daniel Trentin, Ivanhoe (AU)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 16/885,326

(22) Filed: May 28, 2020

(65) Prior Publication Data

US 2020/0377024 A1 Dec. 3, 2020

(30) Foreign Application Priority Data

May 29, 2019 (CN) .......................... 201910457620.0

(51) Int. Cl.
*B60R 7/04* (2006.01)
*E05D 3/12* (2006.01)
*E05F 5/00* (2017.01)

(52) U.S. Cl.
CPC ................ *B60R 7/04* (2013.01); *E05D 3/122* (2013.01); *E05F 5/00* (2013.01); *E05Y 2201/604* (2013.01); *E05Y 2900/538* (2013.01)

(58) Field of Classification Search
CPC ... B60R 7/04; E05D 3/122; E05D 5/02; E05F 5/00; E05Y 2201/604; E05Y 2201/256; E05Y 2201/266; E05Y 2201/638; E05Y 2201/71; E05Y 2900/538; Y10T 16/541; Y10T 16/61; B60N 2/793
USPC .......................... 296/24.34, 37.8; 16/354, 82
See application file for complete search history.

(56) References Cited

U.S. PATENT DOCUMENTS

| 5,887,930 A | * | 3/1999 | Klein ..................... B62D 25/12 |
| | | | 296/37.9 |
| 5,893,478 A | * | 4/1999 | Maruoka ................. E05B 83/32 |
| | | | 220/675 |
| 6,662,405 B2 | * | 12/2003 | Vitry ....................... E05C 17/38 |
| | | | 16/354 |

(Continued)

FOREIGN PATENT DOCUMENTS

| CN | 103419692 A | * 12/2013 |
| CN | 104006069 B | 4/2016 |

(Continued)

*Primary Examiner* — William L Miller
(74) *Attorney, Agent, or Firm* — Vichit Chea; Price Heneveld LLP

(57) ABSTRACT

An armrest console includes an armrest, a fixed gear coupled to a top of a storage compartment in the armrest console, an elevating gear coupled to the armrest; a dampener gear engaged with the elevating gear and the fixed gear, and a gear connector to receive the elevating gear and the dampener gear. When the armrest is rotated about an axis of the elevating gear in a counterclockwise direction to open, the elevating gear is rotated in the counterclockwise direction and the dampener gear is rotated in a clockwise direction and both the elevating gear and the dampener gear are rotated about an axis of the fixed gear, and wherein the elevating gear and the dampener gear are moved up at a height direction when the armrest is rotated to open.

20 Claims, 9 Drawing Sheets

(56) References Cited

U.S. PATENT DOCUMENTS

| | | | |
|---|---|---|---|
| 6,761,388 B2 | 7/2004 | Lein et al. | |
| 7,591,395 B2* | 9/2009 | Hamaguchi | E05C 19/022 |
| | | | 220/835 |
| 8,074,832 B2* | 12/2011 | Fujiwara | B60N 2/793 |
| | | | 220/811 |
| 8,684,440 B2* | 4/2014 | Hishon | B60N 3/101 |
| | | | 296/37.8 |
| 9,038,842 B2 | 5/2015 | Doll | |
| 9,409,502 B2 | 8/2016 | Anderson et al. | |
| 9,676,341 B2 | 6/2017 | Gaudig | |
| 10,486,568 B2* | 11/2019 | Davis | B60N 2/797 |
| 2003/0208882 A1* | 11/2003 | Kim | B60N 2/793 |
| | | | 16/354 |
| 2003/0234554 A1* | 12/2003 | Maierholzner | B60N 2/793 |
| | | | 296/153 |
| 2004/0251746 A1* | 12/2004 | Ichimaru | B60N 3/102 |
| | | | 307/116 |
| 2005/0248170 A1* | 11/2005 | Kawamoto | B60N 2/793 |
| | | | 296/24.34 |
| 2006/0208506 A1* | 9/2006 | Kern | E05B 77/42 |
| | | | 292/304 |
| 2006/0283668 A1* | 12/2006 | Ogura | E05F 1/1008 |
| | | | 267/156 |
| 2007/0236036 A1* | 10/2007 | Downey | B60N 2/793 |
| | | | 248/311.2 |
| 2010/0050380 A1* | 3/2010 | Fujiwara | B60R 7/04 |
| | | | 16/242 |
| 2011/0049924 A1* | 3/2011 | Kim | B60N 2/75 |
| | | | 296/24.34 |
| 2012/0319422 A1* | 12/2012 | Kang | B60R 7/04 |
| | | | 296/24.34 |
| 2013/0026778 A1* | 1/2013 | Biggs | B60R 7/04 |
| | | | 296/37.1 |
| 2015/0176640 A1* | 6/2015 | Serocki | F16C 11/10 |
| | | | 16/333 |
| 2015/0239375 A1* | 8/2015 | Anderson | B60R 7/04 |
| | | | 248/118 |
| 2018/0178687 A1* | 6/2018 | Choi | B60N 2/753 |

FOREIGN PATENT DOCUMENTS

| | | |
|---|---|---|
| CN | 208306519 U | 1/2019 |
| JP | 2004182095 A | 7/2004 |

* cited by examiner

HINGE MECHANISM AND ARMREST CONSOLE INCLUDING HINGE MECHANISM

FIELD OF THE DISCLOSURE

The present invention generally relates to a hinge mechanism which enables a cover to rotate about two axes, and also particularly relates to an armrest console including a hinge mechanism.

BACKGROUND OF THE DISCLOSURE

An armrest hinge of an armrest console in a motor vehicle typically employs a gooseneck hinge which usually requires significant motion space within the armrest console to operate and thus restricts the design choice as well as the architecture of the console. In some designs, the kinematic restrictions and/or the need to prevent the possible blocking of rear vents may lead to a reduction of the desired opening angle, such as a 95 degrees or greater opening angle.

SUMMARY OF THE DISCLOSURE

According to one aspect of the present disclosure, an armrest console is provided. The armrest console comprises an armrest, a fixed gear coupled to a top of a storage compartment in the armrest console, an elevating gear coupled to the armrest, a dampener gear engaged with the elevating gear and the fixed gear, and a gear connector to receive the elevating gear and the dampener gear. When the armrest is rotated about an axis of the elevating gear in a counterclockwise direction to open, the elevating gear is rotated in the counterclockwise direction and the dampener gear is rotated in a clockwise direction and both the elevating gear and the dampener gear are rotated about an axis of the fixed gear.

In one embodiment, a diameter of the fixed gear may be greater than a diameter of the dampener gear and greater than a diameter of the elevating gear.

In another embodiment, the fixed gear may be a sector gear, and the elevating gear and the dampener gear may be gear wheels.

The armrest console may further comprise a base disposed on the top of the storage compartment. The gear connector may include a first portion and a second portion. The first portion may be coupled to the armrest and wherein the second end portion is rotatably connected to the base.

In another embodiment, the gear connector may have a plate shape, and wherein an engagement plane of the elevating gear, the dampener gear and the fixed gear is substantially parallel to the gear connector.

According to another aspect of the disclosure, an armrest console is provided which comprises a storage compartment having an opening, an armrest configured to cover the opening and having a rear end coupled to the storage compartment, and at least one hinge mechanism. The hinge mechanism includes a gear connector positioned at a top of the storage compartment and having a first portion and a second portion, an elevating gear coupled to the armrest and the first portion of the gear connector, a fixed gear coupled to the second portion of the gear connector and positioned at the top of the storage compartment, and a dampener gear engaged with the elevating gear and the fixed gear. A diameter of the fixed gear may be greater than a diameter of the dampener gear. The elevating gear and the dampener gear are moved up at a height direction when the armrest is rotated to open.

In one embodiment, the dampener gear may be positioned at the top of the storage compartment. When the armrest is rotated about an axis of the armrest gear in a counterclockwise direction to open, the armrest gear is rotated in the counterclockwise direction and the dampener gear is rotated in a clockwise direction and both the armrest gear and the dampener gear are rotated about an axis of the fixed gear.

In another embodiment, the hinge mechanism may further comprise a base disposed on the top of the storage compartment and having a side support. The first portion of the gear connector may be connected to the dampener gear and the second portion of the gear connector may be pivotally connected to the side support.

In another embodiment, the hinge mechanism may further comprise a carrier to hold the armrest and is disposed on the base. The carrier may include a side mount having a main surface substantially parallel to a main surface of the gear connector, and the elevating gear may be connected to the side mount.

In another embodiment, the elevating gear may be integrally formed on the side mount.

In another embodiment, the side support may have a main surface substantially parallel to the main surface of the gear connector, and the fixed gear may be a sector gear and may be integrally formed on a top edge of the side support.

In another embodiment, the dampener gear may include a gear base and a gear body, and the gear connector may include a recess to receive the gear base. An engagement plane of the elevating gear, the dampener gear and the fixed gear may be substantially parallel to the main surface of the gear connector.

In another embodiment, the side mount of the carrier may be aligned with the side support of the base at a lengthwise direction.

In another embodiment, the gear connector may partially overlap the side mount of the carrier and the side support of the base.

In another embodiment, the at least hinge mechanism includes a left hinge mechanism and a right hinge mechanism. The left hinge mechanism may include a left elevating gear, a left fixed gear, a left dampener gear engaging with the left elevating gear and the left fixed gear, and a left carrier. The right hinge mechanism may include a right elevating gear, a right fixed gear, a right dampener gear engaging with the right elevating gear and the right fixed gear, and a right carrier. The side support may include a left-side support and a right-side support and the base may include a beam disposed between the left-side support and the right-side support. The left carrier and the right carrier may be disposed on the beam.

In another embodiment, the left-side support and the right-side support may be integrally formed with the beam.

In another embodiment, the rear end of the armrest may be located at the top of the storage compartment at a fully open position such that air flows freely from vents positioned in the preferred upper region on a rear wall of the storage compartment.

In another embodiment, the armrest is opened greater than 90 degree at a fully open position.

According to another aspect of the disclosure, a hinge mechanism is provided to connect a cover and a body. The hinge mechanism includes a gear connector, an elevating gear connected to a first portion of the gear connector and adapted to be coupled with the cover, a fixed gear adapted to be coupled with the body, and a dampener gear engaged with the elevating gear and the fixed gear and disposed on the gear connector. When the cover is opened, the elevating gear is rotated up about an axis of the elevating gear in a counterclockwise direction and the dampener gear is rotated in a clockwise direction and both the elevating gear and the dampener gear are rotated about an axis of the fixed gear.

In one embodiment, a diameter of the fixed gear may be greater than a diameter of the dampener gear and greater than a diameter of the elevating gear. The elevating gear and the dampener gear may be gear wheels and the fixed gear may be a sector gear. The hinge mechanism is disposed on a top of the body.

These and other aspects, objects, and features of the present invention will be understood and appreciated by those skilled in the art upon studying the following specification, claims, and appended drawings.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE PREFERRED EMBODIMENTS

The disclosed hinge mechanisms and armrest consoles will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various hinge mechanisms and armrest consoles are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
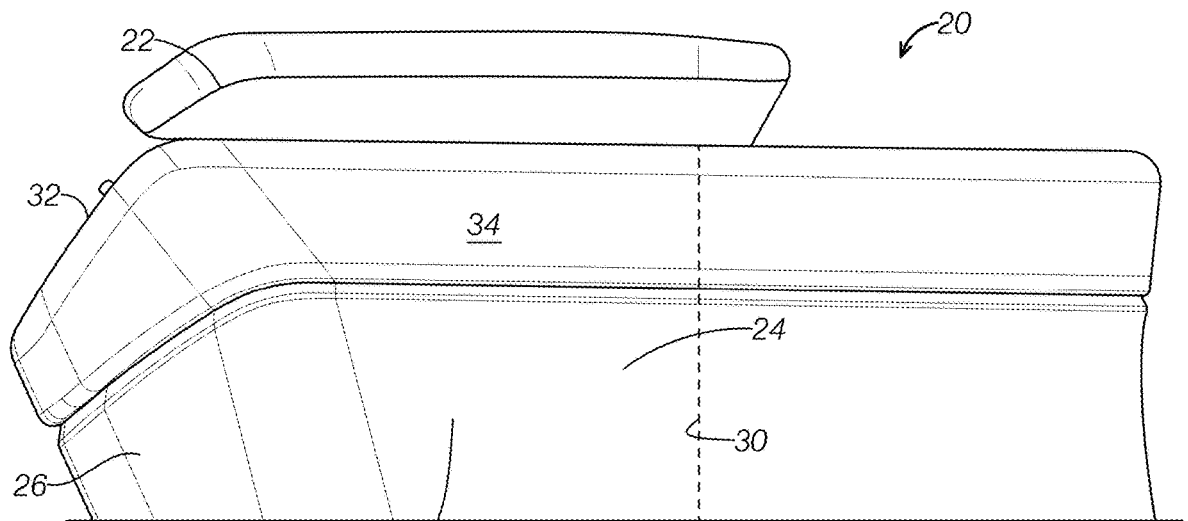
FIG. 1 is a partial view of an armrest console according to one embodiment, illustrating an armrest at a closed position.
Figure 2:
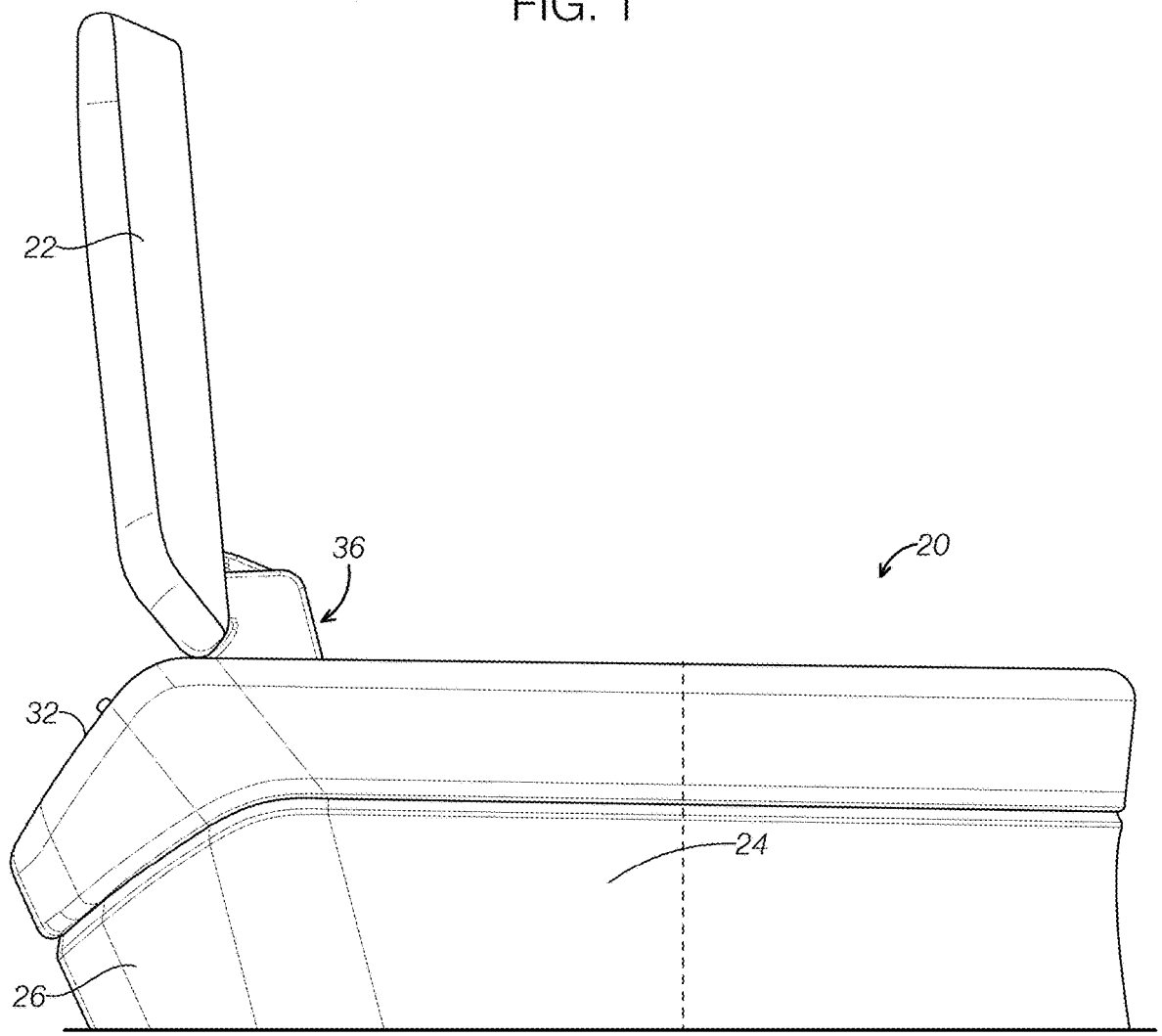
FIG. 2 is a partial view of the armrest console in FIG. 1, illustrating the armrest console at a fully open position.

Referring to FIGS. 1-2, FIG. 1 is a partial view of an armrest console 20 according to one embodiment of the present disclosure, illustrating an armrest at a closed position and FIG. 2 is a partial view of the armrest console in FIG. 1, illustrating the armrest console 20 at a fully open position. The armrest console 20 may comprise an armrest 22 and a storage compartment 24. The storage compartment 24 includes a rear wall 26, two sidewalls 28 and a front wall 30. The armrest 22 is positioned on a top 32 of the storage compartment 24 to cover an opening 34 formed by the rear wall 26, sidewalls 28 and the front wall 30. A hinge mechanism 36 is configured to move the armrest 22 between a closed position shown in FIG. 1 and a fully open position shown in FIG. 2. At the fully open position as shown in FIG. 2, the armrest 22 is positioned above the storage compartment 24. That is, the armrest 22 is moved up and forward via the hinge mechanism 36 when the armrest is opened.

In some embodiments, the armrest console 20 may be used in a vehicle, such as a motor vehicle where the armrest console 2 is located between a pair of seats such as a driver seat and an adjacent passenger seat. The front wall 30 faces a front of the vehicle and the rear wall 26 faces a rear of the vehicle. As the hinge mechanism 36 is positioned outside the storage compartment 24, more space is available in the storage compartment 24, or for use of routing air ducting to vents positioned in the preferred higher position on the back wall 26. Further, as the armrest 22 is moved up and forward at an open position, there is no blockage to these rear vents located on the upper rear wall 26 of the storage compartment 24. It should be appreciated that the hinge mechanism of the present disclosure may be used in other applications.

Figure 3:
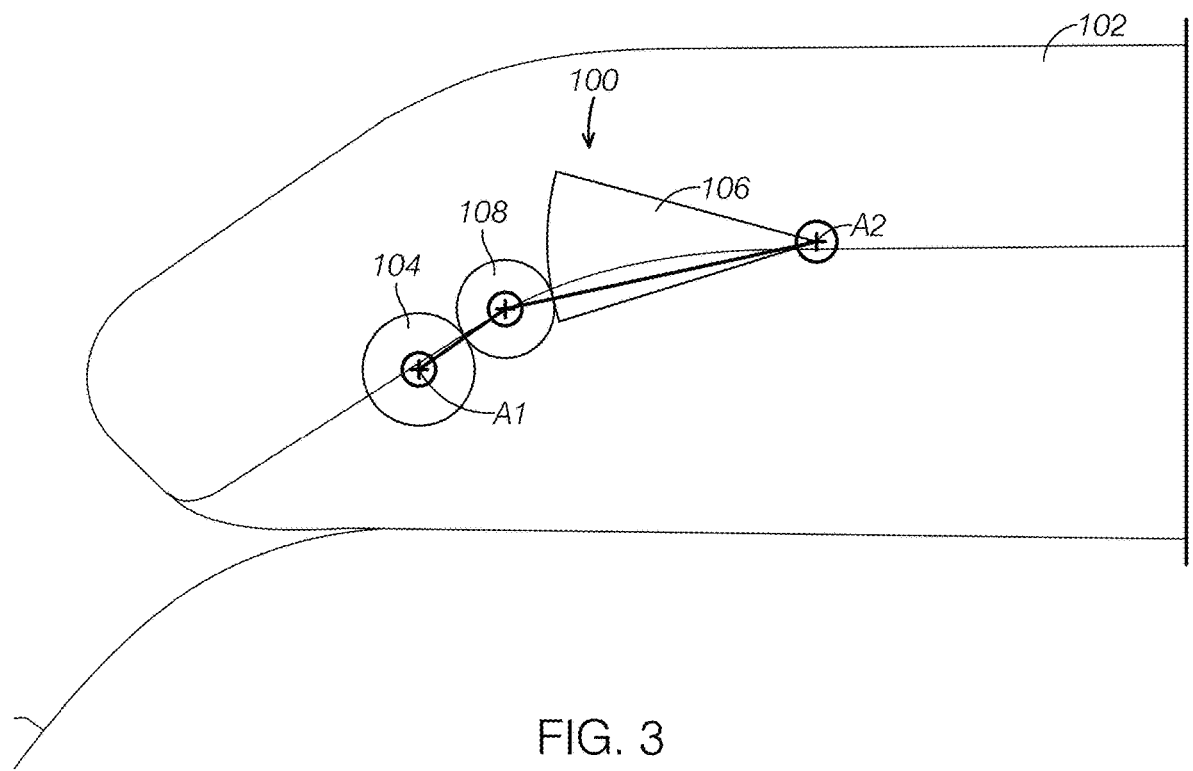
FIG. 3 is a schematic view of a hinge mechanism used according to one embodiment, illustrating a cover at a closed position.
Figure 4:
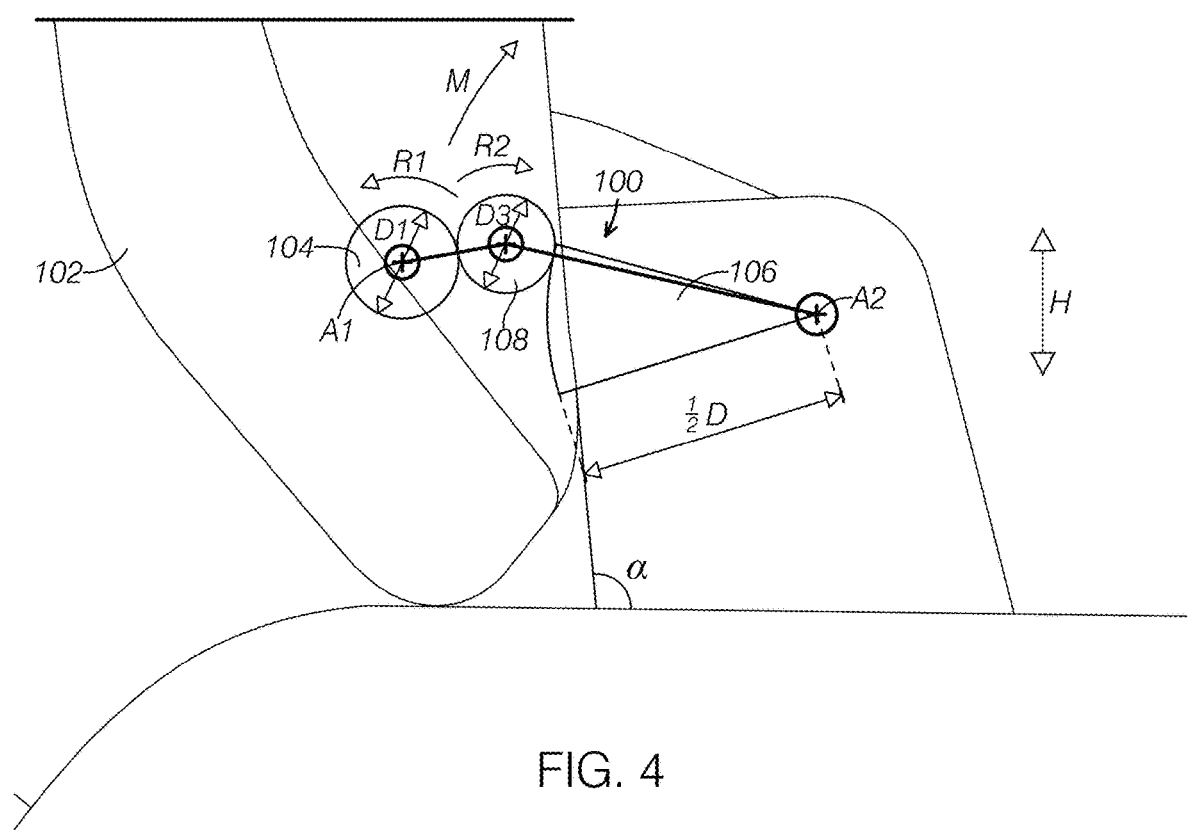
FIG. 4 is a schematic view of the hinge mechanism in FIG. 3, illustrating the cover at an open position.

Referring to FIGS. 3 and 4, FIG. 3 is a schematic view of a hinge mechanism 100 according to one embodiment, illustrating a cover 102 at a closed position and FIG. 4 is a schematic view of the hinge mechanism in FIG. 3, illustrating the cover 102 at an open position. The hinge mechanism 100 may be used to connect the cover 102 to a compartment. In some embodiments, the hinge mechanism 100 may be used in an armrest console in a vehicle, the compartment may be a storage compartment in an armrest console and the cover 102 may be an armrest to support forearm and cover an opening of the storage compartment. The hinge mechanism 100 may comprise an elevating gear 104 connected to the armrest 102, a fixed gear 106, coupled to a top of the storage compartment, and a dampener gear 108 engaged with the elevating gear 104 and the fixed gear 106. The elevating gear 104 and the dampener gear 108 may be gear wheels. The fixed gear 106 may have a diameter D1 greater than a diameter D2 of the elevating gear 104 and greater than a diameter D3 of the dampener gear 108. In the depicted embodiment, the elevating gear 104 and the dampener gear 108 are gear wheels and the fixed gear 106 is a sector gear which is a portion of a gear wheel and has teeth on a rim.

As shown in FIG. 4, when the armrest 102 is rotated about an axis A1 of the elevating gear 104 in a counterclockwise direction to open, the elevating gear 104 is rotated in the counterclockwise direction R1 and the dampener gear 108 is rotated in a clockwise direction R2. Meanwhile, both the elevating gear 104 and the dampener gear 108 are moved about an axis A2 of the fixed gear 106 in a direction as shown by arrow M. In this way, the elevating gear 104 and the dampener gear 108 moved up at a height direction H when the armrest 102 is opening. The hinge mechanism 100 has dual axes A1 and A2. That is, the armrest 102 is rotated about two axes A1 and A2 via the hinge mechanism 100 when the armrest 102 is opened or closed. At the fully open position, the armrest 102 can form an open angle α greater than ninety degrees (90°) relative to a horizon direction.

The hinge mechanism 100 may further include a gear connector 140. The gear connector 140 is configured to keep the dampener gear 108 and the elevating gear 104 on the same radial position to the fixed gear 106 while the dampener gear 108 and the elevating gear 104 are rotating about the axis A2 of the fixed gear 106. The example embodiments of the gear connector 140 will be described in details below.

As shown in FIG. 3, in one embodiment, the hinge mechanism 100 is positioned inside a space define by an outer profile of the armrest 102 at the closed position.

Figure 5:
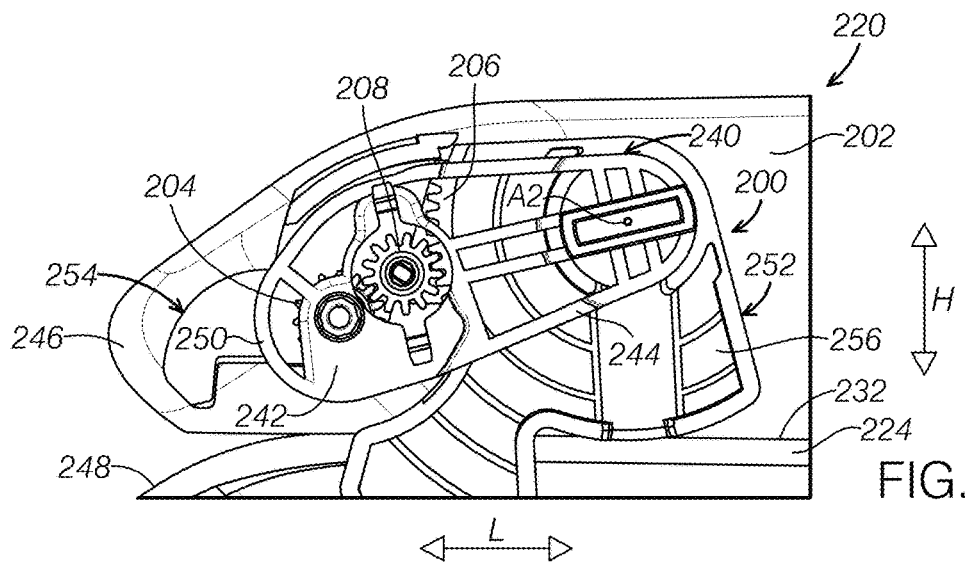
FIG. 5 is a partial cross-sectional view of an armrest console according to one exemplary embodiment of the present disclosure, illustrating an armrest at a closed position.
Figure 6:
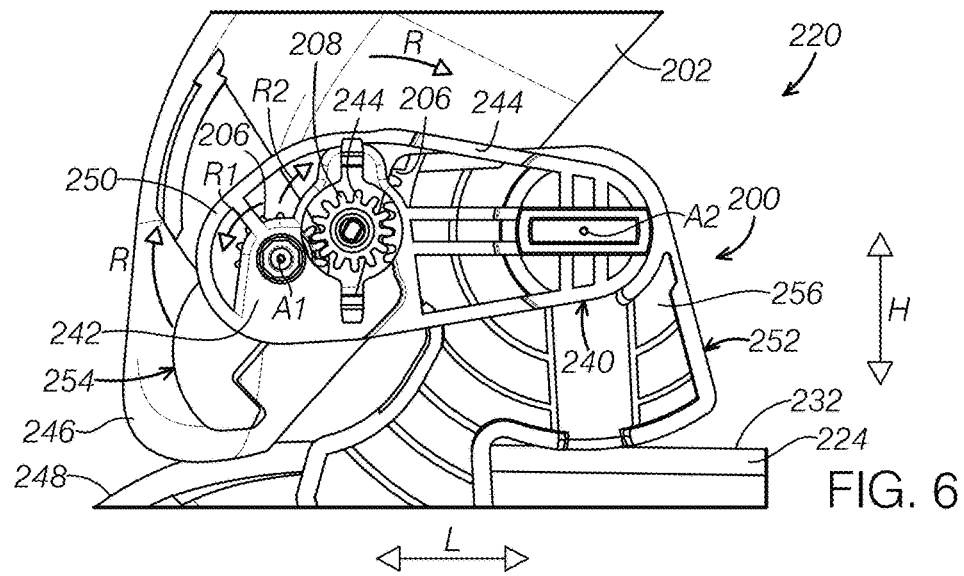
FIG. 6 is a partial cross-sectional view of the armrest console in FIG. 5, illustrating the armrest at a half-open position.
Figure 7:
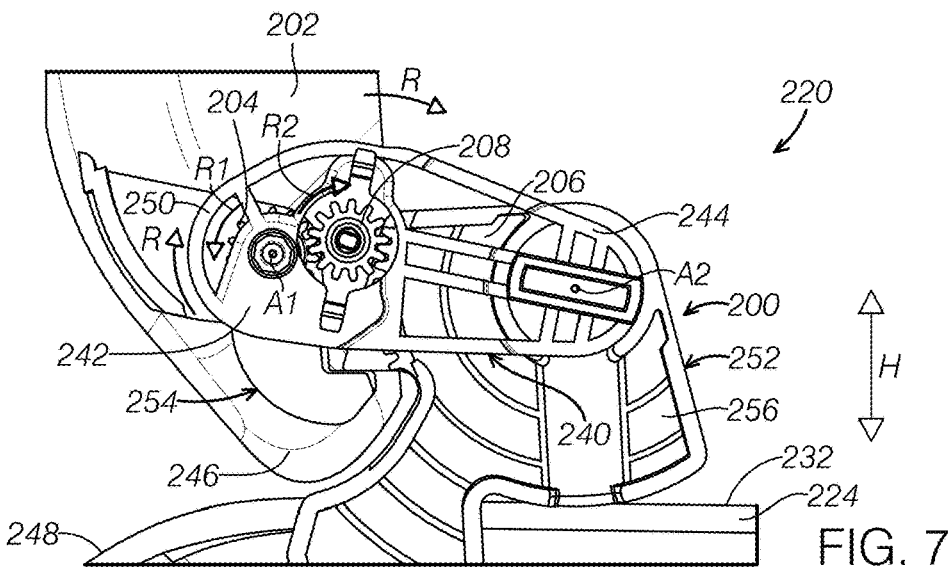
FIG. 7 is a partial cross-sectional view of the armrest console in FIG. 5, illustrating the armrest at an open position.

Referring to FIGS. 5-7, FIG. 5 is a partial cross-sectional view of an armrest console 220 according to one exemplary embodiment, illustrating an armrest 202 at a closed position, FIG. 6 is a partial cross-sectional view of the armrest console 220 in FIG. 5, illustrating the armrest 202 at a half-open position, and FIG. 7 is a partial cross-sectional view of the armrest console 220 in FIG. 5, illustrating the armrest 202 at a fully open position. The armrest console 220 may comprise an armrest 202 configured to support forearm and cover a storage compartment 224 and a hinge mechanism 200 to pivotally connect the armrest 202 to the storage compartment 224. The hinge mechanism 200 may comprise an elevating gear 204 connected to the armrest 202, a fixed gear 206 coupled to the storage compartment 224, and a dampener gear 208 engaged with the elevating gear 204 and the fixed gear 206. The term "coupled" refers to coupling one part indirectly or directly with another part.

The hinge mechanism 200 may further comprise a gear connector 240. The gear connector 240 may be positioned on a top 232 of the storage compartment 224 and having a first portion 242 and a second portion 244 along a lengthwise direction L of the armrest console 220. The elevating gear 204 is connected to a rear end 246 of armrest 202 and rotatably connected to the first portion 242 of the gear connector 240. The dampener gear 208 is disposed on the gear connector 240 and connected to the gear connector 240.

As shown in FIGS. 5-7, when the armrest 202 is opened or closed, the armrest 202 is rotated about dual axes A1 and A2. The axis A1 is an axis of the elevating gear 204 and the axis A2 is an axis of the fixed gear 206. In the opening process, the elevating gear 204 is rotated in the counterclockwise direction R1 and the dampener gear 208 is rotated in a clockwise direction R2. Meanwhile, the gear connector 240 is rotated in a clockwise direction R about the axis A2 of the fixed gear 206 and both the elevating gear 204 and the dampener gear 208 are rotated about an axis A2. Due to the dual axis hinge operation, the elevating gear 204 and a rear end 246 of the armrest 202 moves up relative to the storage compartment 224 as well as moves forward relative to a rear wall 248 of the storage compartment 224 when the armrest 202 is opened as shown in FIGS. 5-7. FIGS. 5-7 further show that a first end 250 of the gear connector 240 is moved up at the height direction H. When the armrest 203 is closed, the elevating gear 204 and a fixed end 246 of the armrest 202 moves down and rearward.

Figure 8:
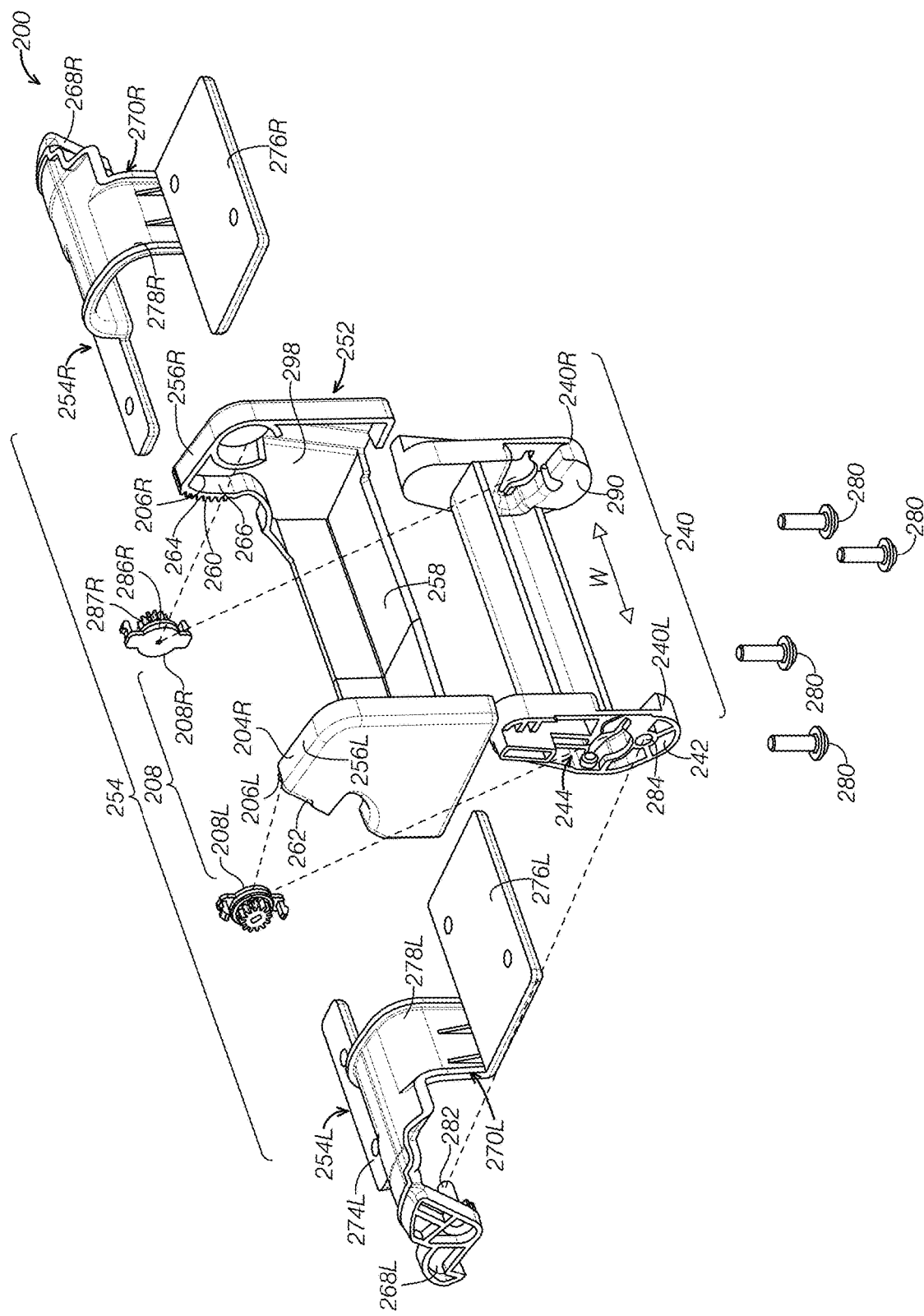
FIG. 8 is an exploded view of a hinge mechanism of an armrest console in FIG. 5.

Referring to FIG. 8 and with further reference to FIGS. 5-7, in some embodiments, the hinge mechanism 200 further comprises a base 252 and a carrier 254. The base 252 is disposed on the top 232 of the storage compartment 224 and configured to connect the fixed gear 206. In some embodiments, the base 252 may include a side support 256. In the depicted embodiment, the side support 256 includes a left-side support 256L, a right-side support 256R and a beam 258 connecting the left-side support 256L and the right-side support 256R. The beam 258 is disposed between the left-side support 256L and the right-side support 256R and extends along a width direction W of the armrest console 220. The left-side support 256L and the right-side support 256R may have a plate shape and may be substantially perpendicular to the beam 258. The fixed gear 206 may include a left fixed gear 206L and a right fixed gear 206R. In some embodiments, the left fixed gear 206L and the right gear 206R are integrally formed with the left-side support 206L and the right-side support 256R, respectively. For example, teeth 260 of left fixed gear 206L may be integrally formed on a top edge 262 of the left-side support 256L and teeth 264 of the right fixed gear 206R may be integrally formed on a top edge 266 the right-side support 256R. The left fixed gear 206L may be a sector gear and the right fixed gear 206R may be a sector gear.

Figure 9:
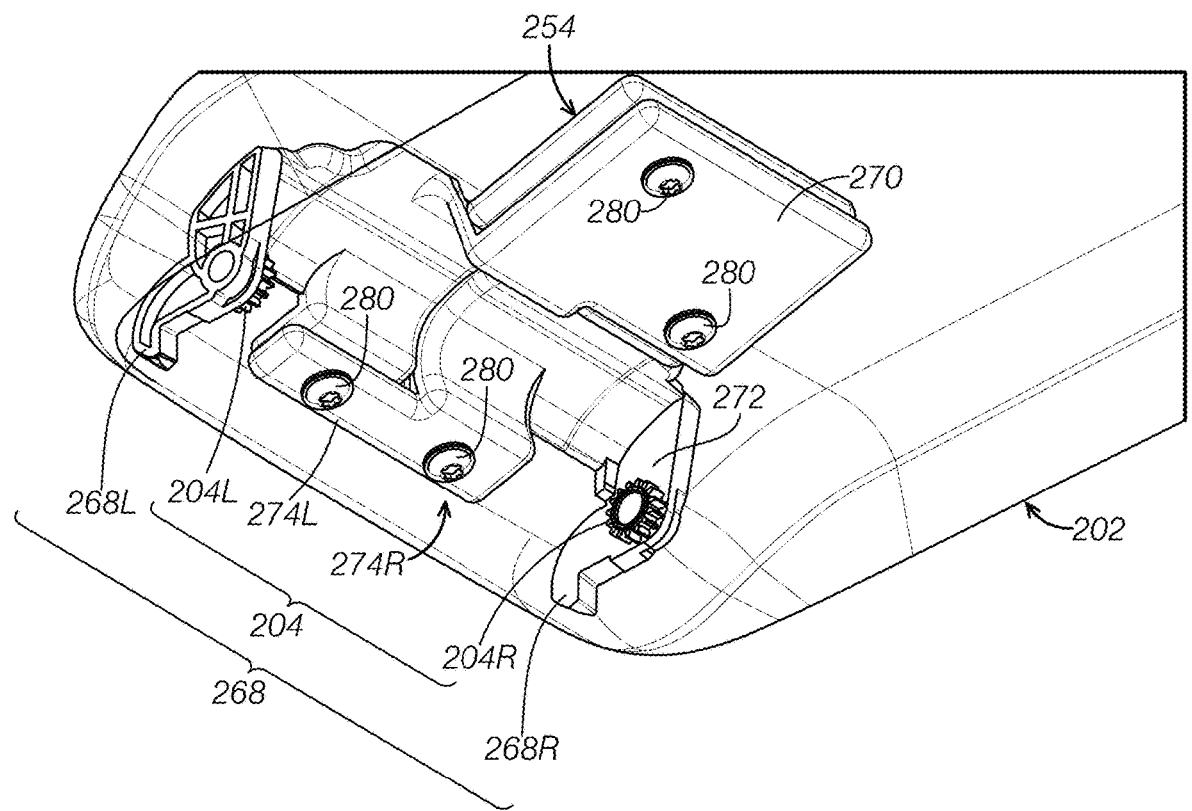
FIG. 9 is a partial view of the hinge mechanism in FIG. 8.

Referring to FIGS. 8 and 9, the carrier 254 is connected to the armrest 202 and configured to hold the armrest 220 and connect with the elevating gear 204. The carrier 254 may include a side mount 268 coupled with the gear connector 240 and a main body 270 connected with armrest 202. The side mount 268 may have a plate shape and may be substantially parallel to the side support 256 of the base 252. The elevating gear 204 is connected to the side mount 268. In the depicted embodiment, the elevating gear 204 is integrally formed on an inner surface 272 of the side mount 268 as shown in FIG. 9. The carrier 254 includes a left carrier 254L and a right carrier 254R. The left carrier 254L includes a left-side mount 268L and a left main body 270L. The left main body 270L may include a rear portion 274L, a flat plate 276L and an arm 278L connecting the rear portion 274L and the flat plate 276L. Similarly, the right main body 270R may include a rear portion 274R, a flat plate 276R and an arm 278R connecting the rear portion 274R and the flat plate 276R.

Referring to FIG. 9 and with further reference to FIG. 8, the carrier 254 is connected to the armrest 202 by a plurality of fasteners 280. In this way, the elevating gear 204 is connected to the armrest 202 and becomes a part of the armrest 202.

Figure 10:
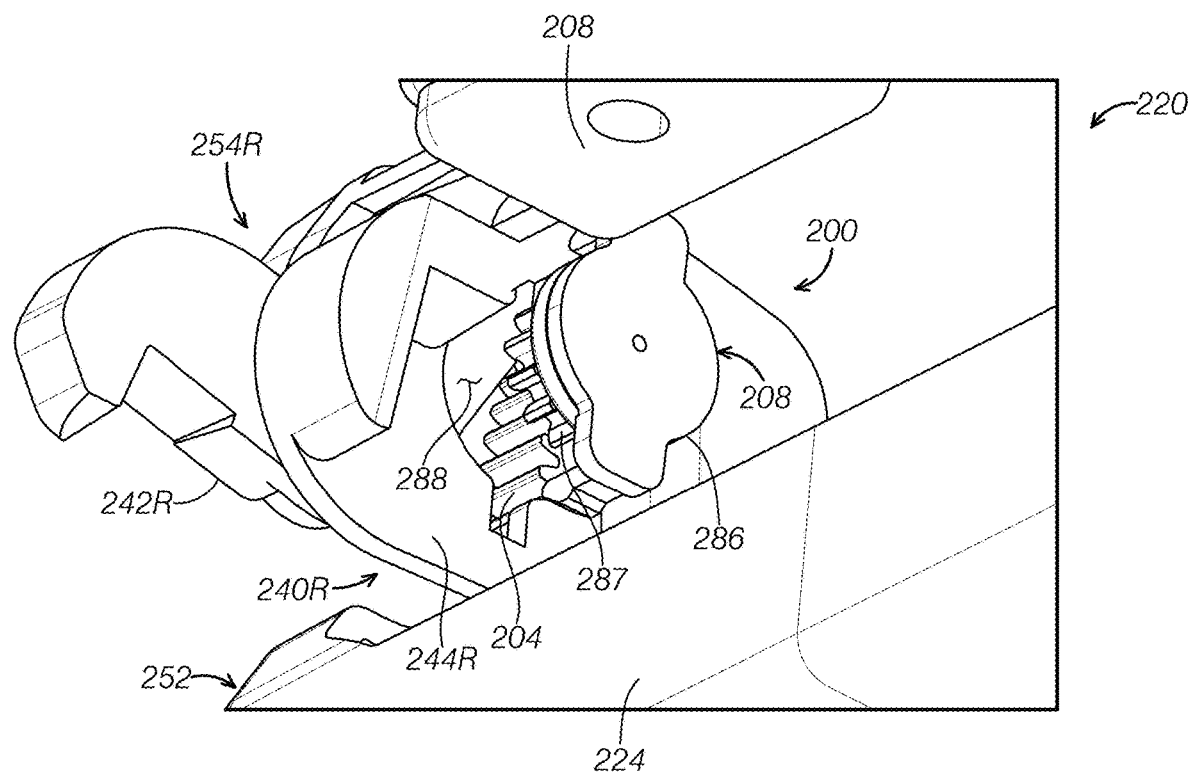
FIG. 10 is another partial view of the hinge mechanism in FIG. 8.

Referring to FIGS. 7, 8 and 10, the gear connector 240 may have a plate like shape. The first portion 242 of the gear connector 240 is connected with the side mount 268 of the carrier 254. In the depicted embodiment, the side mount 268 includes a pin 282 and the pin 282 is inserted into a hole 284 on the gear connector 240 such that the side mount 268 is connected with the gear connector 240 and the elevating gear 204 on the side mount 268 is engaged with the dampener gear 208 disposed on the gear connector 240. It should be appreciated that the side mount 268 may be connected with the gear connector 240 with any appropriate approaches. For example, the gear connector 240 may include a pin for inserting into a hole formed inside the elevating gear 204.

Referring FIG. 10, in the depicted embodiment, the dampener gear 208 includes a gear base 286 and gear body 287. The gear connector 240 includes a through hole 288 to receive the gear base 286 such that the dampener gear 208 is connected to the gear connector 240 and engaged with the elevating gear 204. It should be appreciated that the dampener gear 208 may be connected to the gear connector 240 with any appropriate approaches. The gear connector 240 enables the elevating gear 204, the dampener gear 208 and the fixed gear 206 being engaged in an engagement plane securely.

Figure 11:
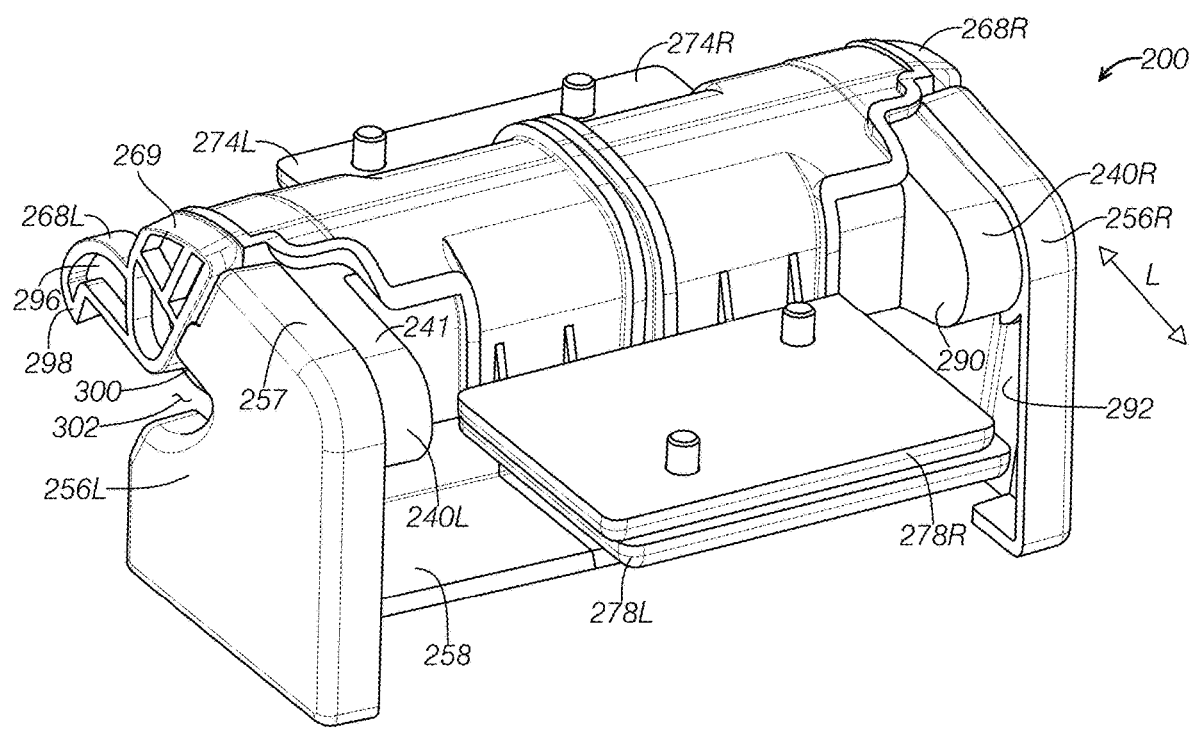
FIG. 11 is a perspective view of the hinge mechanism in FIG. 5, illustrating the armrest at the closed position.
Figure 12:
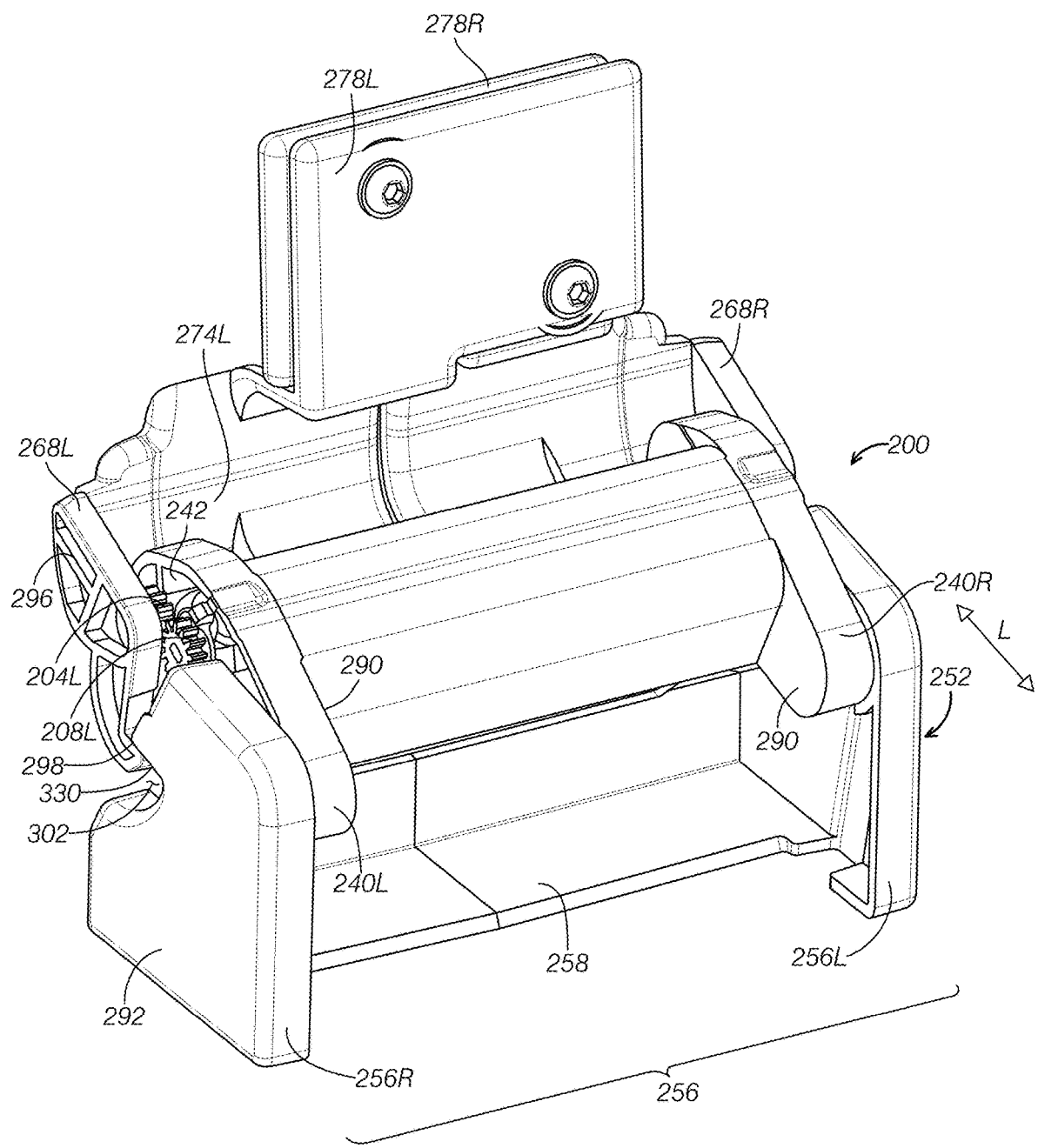
FIG. 12 is a perspective view of the hinge mechanism in FIG. 5, illustrating the armrest at the open position.

Referring to FIGS. 8, 11 and 12, a main surface 290 of the gear connector 240 is substantially parallel to a main surface 292 of the side support 256 and a main surface 296 of the side mount 268. As shown in FIGS. 11-12, the side mount 268 is aligned with the side support 256 at a lengthwise direction L. Further, the side mount 268 and the side support 256 partially overlap with the gear connector 240. At the closed position of the armrest 202 shown in FIG. 11, a top 269 of the side mount 268, a top 257 of the side support 256 and a top 241 of the gear connector 240 flush each other or are positioned in a same plane. At the open position shown in FIG. 12, the elevating gear 204 and the dampener gear 208 move up. That is, the axis of the elevating gear 204 is moved up while the elevating gear 204 is rotated. Further, as shown in FIG. 12, the side mount 268 or the rear end of the armrest 202 move up as the armrest 202 is opened. Further, as shown in FIG. 12, the first portion 242 of the gear connector 240 moves up as the armrest 202 is opened.

Referring to FIGS. 11-12, the side mount 268 includes a stop 298 and the stop 298 is positioned at a rear and spaced apart from the side support 256 when the armrest is at the closed position. The side support 256 includes a stop surface 300 which is a surface of a recess 302 formed on a rear wall of the side support 268. The stop 298 touches the stop surface 300 to prevent further movement when the armrest 202 is at the fully open position.

Figure 13:
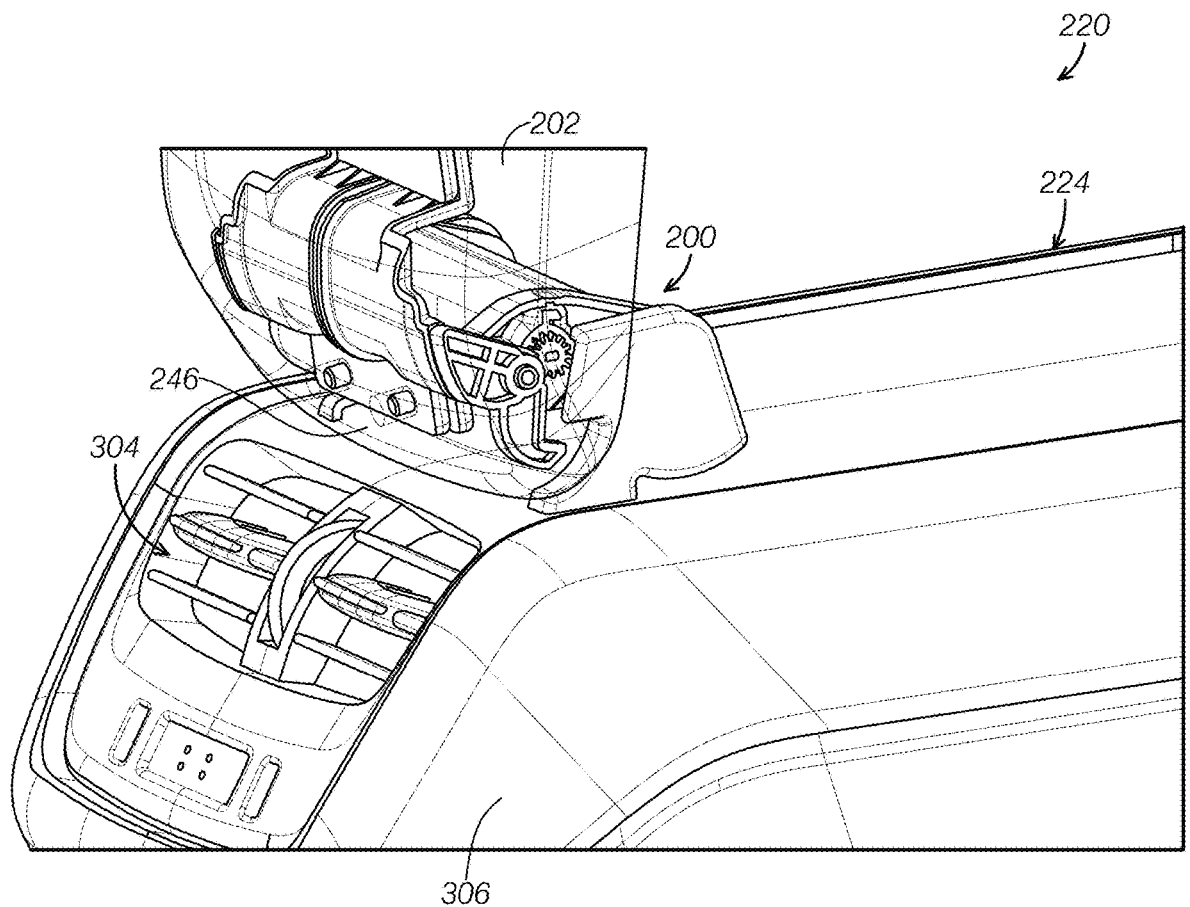
FIG. 13 is a partial perspective view of an armrest console in FIG. 5.

The hinge mechanism has dual axes around which the armrest is rotated to open or close such that the armrest moves up and forward during the opening position. The hinge mechanism does not occupy a space at the rear of the armrest console and does not affect function of the rear side ventilation of the armrest console. FIG. 13 is a partial view of the armrest console 220 and illustrates the armrest 202 at an open position. An air outlet assembly 304 may be formed on an upper rear wall 306 of the armrest console 220 to provide airflow to the rear seat passengers. Because a rear end 246 of the armrest 202 is positioned above the armrest console 220 at the open position, the airflow from the air outlet assembly 304 is not blocked.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An armrest console, comprising:
   an armrest;
   a fixed gear coupled to a top of a storage compartment in the armrest console;
   an elevating gear coupled to the armrest;
   a dampener gear engaged with the elevating gear and the fixed gear; and
   a gear connector to receive the elevating gear and the dampener gear,
   wherein, when the armrest is rotated about an axis of the elevating gear in a counterclockwise direction to open, the elevating gear is rotated in the counterclockwise direction and the dampener gear is rotated in a clockwise direction and both the elevating gear and the dampener gear are rotated about an axis of the fixed gear.

2. The armrest console of claim 1, wherein a diameter of the fixed gear is greater than a diameter of the dampener gear and greater than a diameter of the elevating gear.

3. The armrest console of claim 2, wherein the fixed gear is a sector gear, and the elevating gear and the dampener gear are gear wheels, and wherein the gear connector has a plate shape, and wherein an engagement plane of the elevating gear, the dampener gear and the fixed gear is substantially parallel to the gear connector.

4. The armrest console of claim 1, further comprising a base disposed on the top of the storage compartment, wherein the gear connector includes a first portion and a second portion, wherein the first portion is coupled to the armrest, and wherein the second end portion is rotatably connected to the base.

5. The armrest console of claim 1, wherein the armrest console is a vehicle armrest console configured to be assembled into a vehicle.

6. An armrest console, comprising:
   a storage compartment having an opening;
   an armrest configured to cover the opening and having a rear end coupled to the storage compartment;
   at least one hinge mechanism including:
      a gear connector positioned at a top of the storage compartment and having a first portion and a second portion;

an elevating gear coupled to the armrest and the first portion of the gear connector;

a fixed gear coupled to the second portion of the gear connector and positioned at the top of the storage compartment; and a dampener gear engaged with the elevating gear and the fixed gear, wherein a diameter of the fixed gear is greater than a diameter of the dampener gear, and wherein the elevating gear and the dampener gear are moved up at a height direction when the armrest is rotated to open.

7. The armrest console of claim 6, wherein the dampener gear is positioned at the top of the storage compartment, and wherein, when the armrest is rotated about an axis of the armrest gear in a counterclockwise direction to open, the armrest gear is rotated in the counterclockwise direction and the dampener gear is rotated in a clockwise direction and both the armrest gear and the dampener gear are rotated about an axis of the fixed gear.

8. The armrest console of claim 7, wherein the hinge mechanism further comprises a base disposed on the top of the storage compartment and having a side support, wherein the first portion of the gear connector is connected to the dampener gear and the second portion of the gear connector is pivotally connected to the side support.

9. The armrest console of claim 8, wherein the hinge mechanism further comprises a carrier to hold the armrest and being disposed on the base, wherein the carrier includes a side mount having a main surface substantially parallel to a main surface of the gear connector, and wherein the elevating gear is connected to the side mount.

10. The armrest console of claim 9, wherein the elevating gear is integrally formed on the side mount.

11. The armrest console of claim 10, wherein the side support has a main surface substantially parallel to the main surface of the gear connector, and wherein the fixed gear is a sector gear and is integrally formed on a top edge of the side support.

12. The armrest console of claim 10, wherein the dampener gear includes a gear base and a gear body, and the gear connector includes a recess to receive the gear base, and wherein an engagement plane of the elevating gear, the dampener gear and the fixed gear is substantially parallel to the main surface of the gear connector.

13. The armrest console of claim 12, wherein the side mount of the carrier is aligned with the side support of the base at a lengthwise direction, wherein the gear connector partially overlaps the side mount of the carrier and the side support of the base.

14. The armrest console of claim 8, wherein the armrest console is a vehicle armrest console configured to be assembled into a vehicle.

15. The armrest console of claim 14, wherein the at least one hinge mechanism includes a left hinge mechanism and a right hinge mechanism;

wherein the left hinge mechanism includes:
a left elevating gear,
a left fixed gear,
a left dampener gear engaging with the left elevating gear and the left fixed gear, and
a left carrier;

wherein the right hinge mechanism includes:
a right elevating gear,
a right fixed gear,
a right dampener gear engaging with the right elevating gear and the right fixed gear, and
a right carrier;

wherein the side support includes a left-side support and a right-side support and the base includes a beam disposed between the left-side support and the right-side support, and wherein the left carrier and the right carrier are disposed on the beam.

16. The armrest console of claim 15, wherein the left-side support and the right-side support are integrally formed with the beam.

17. The armrest console of claim 6, wherein the rear end of the armrest is located at the top of the storage compartment at a fully open position such that air flows freely from vents on a rear wall of the storage compartment.

18. The armrest console of claim 6, wherein the armrest is opened greater than 90 degree at a fully open position.

19. A hinge mechanism to connect a cover and a body, comprising:

a gear connector;

an elevating gear connected to a first portion of the gear connector and adapted to be coupled with the cover;

a fixed gear adapted to be coupled with the body; and a dampener gear engaged with the elevating gear and the fixed gear and disposed on the gear connector, wherein, when the cover is opened, the elevating gear is rotated up about an axis of the elevating gear in a counterclockwise direction and the dampener gear is rotated in a clockwise direction and both the elevating gear and the dampener gear are rotated about an axis of the fixed gear.

20. The hinge mechanism of claim 19, wherein a diameter of the fixed gear is greater than a diameter of the dampener gear and greater than a diameter of the elevating gear, wherein the elevating gear and the dampener gear are gear wheels and the fixed gear is a sector gear, and wherein the hinge mechanism is disposed on a top of the body, and wherein the hinge mechanism is configured to be assembled into the cover and body of an armrest console on a vehicle.

* * * * *